(12) United States Patent
Bohlender et al.

(10) Patent No.: US 8,173,935 B2
(45) Date of Patent: May 8, 2012

(54) ELECTRIC AUXILIARY HEATING UNIT FOR A MOTOR VEHICLE

(75) Inventors: Franz Bohlender, Kandel (DE);
Michael Zeyen, Herxheim-Hayna (DE);
Ulrich Mundt, Herxheim (DE)

(73) Assignee: Eberspacher catem GmbH & Co. KG, Herxheim bei Landau (DE)

( * ) Notice: Subject to any disclaimer, the term of this patent is extended or adjusted under 35 U.S.C. 154(b) by 462 days.

(21) Appl. No.: 12/357,112

(22) Filed: Jan. 21, 2009

(65) Prior Publication Data

US 2009/0189420 A1   Jul. 30, 2009

(30) Foreign Application Priority Data

Jan. 24, 2008 (EP) .................................... 08001347

(51) Int. Cl.
*B60L 1/02* (2006.01)
*H05B 1/00* (2006.01)

(52) U.S. Cl. ........................ 219/202; 219/217

(58) Field of Classification Search .................. 219/292, 219/202, 217
See application file for complete search history.

(56) References Cited

U.S. PATENT DOCUMENTS

| | | | |
|---|---|---|---|
| 5,075,537 A | 12/1991 | Lorenzen et al. | |
| 6,772,834 B2 | 8/2004 | Iwamoto et al. | |
| 2003/0183619 A1* | 10/2003 | Bohlender et al. | 219/494 |
| 2004/0195870 A1 | 10/2004 | Bohlender et al. | |
| 2005/0085968 A1 | 4/2005 | Panic | |
| 2005/0230377 A1* | 10/2005 | Bohlender et al. | 219/505 |
| 2005/0238339 A1 | 10/2005 | Bargheer et al. | |
| 2006/0175877 A1 | 8/2006 | Alionte et al. | |
| 2008/0300749 A1 | 12/2008 | Hartmann et al. | |
| 2009/0192671 A1 | 7/2009 | Bohlender | |

FOREIGN PATENT DOCUMENTS

| | | |
|---|---|---|
| DE | 102004030705 B3 | 12/2005 |
| EP | 1511651 B1 | 11/2006 |
| JP | 5069726 A | 3/1993 |
| JP | 6042791 A | 2/1994 |
| JP | 2000142095 A | 5/2000 |
| JP | 2002029238 A | 1/2002 |
| JP | 2002283828 A | 10/2002 |
| JP | 2003252028 A | 9/2003 |
| JP | 2004128278 A | 4/2004 |
| JP | 2005022433 A | 1/2005 |
| JP | 2005145291 A | 6/2005 |
| JP | 2006123874 A | 5/2006 |
| JP | 2006240372 A | 9/2006 |
| JP | 2006273267 A | 10/2006 |
| JP | 2007308045 A | 11/2007 |
| JP | 2007331738 A | 12/2007 |

* cited by examiner

OTHER PUBLICATIONS

European Search Report issued May 13, 2009 for European Patent No. 08 001 347.7.

*Primary Examiner* — Milton Nelson, Jr.
(74) *Attorney, Agent, or Firm* — Boyle Fredrickson, S.C.

(57) ABSTRACT

An electric auxiliary heating unit reliably avoids temperature overshoots of the heated air. To this end, the temperature of the air flowing into the heating is determined and converted into a heating power for controlling the heating elements. This is preferably done via a stored characteristic field via which a plurality of vehicle parameters, such as the vehicle speed, the opening condition of the convertible top, etc., can be taken into account. Also the temperature of the incoming air can be derived from temperature values which are already available in the vehicle. A user-friendly electric heating can be realized very easily in this way. Temperature fluctuations in the heated air can be avoided reliably and easily even in the case of dynamically varying operating conditions of the motor vehicle.

20 Claims, 4 Drawing Sheets

ELECTRIC AUXILIARY HEATING UNIT FOR A MOTOR VEHICLE

BACKGROUND OF THE INVENTION

1. Field of the Invention

The invention relates to an electric auxiliary heating for a motor vehicle. In particular, the invention relates to an auxiliary heating comprising, in addition to a heating element, also a control unit for adjusting the heating power that has to be generated by the heating element.

2. Description of the Related Art

For enhancing the comfort in a motor vehicle, heatings have already been used for a fairly long time. In these heatings, the air sucked in and discharged by a blower is heated making use of the waste heat of the engine or of additional heating modules and then blown into the vehicle passenger compartment. The heating power of such heatings installed in fittings, seats or other parts of the vehicle is normally manually determined by the user, but the user does not have much influence on the precise temperature of the air discharged.

Since it is normally only possible to predetermine the heating power or a heating power stage, it is not always easy to achieve a desired room temperature in the passenger compartment. In the initial heating phase, very little heating power is often available e.g. due to a cold engine. Hence, the user first selects a very high heating power or he makes use of electric auxiliary heatings. When the temperature of the engine increases, the air blown into the passenger compartment will, however, have a temperature that is much higher than the temperature desired by the vehicle passenger so that the latter will reduce the heating power of the auxiliary heating or the selected heating stage. In most cases, the heating power is, however, reduced to such an extent that the temperature in the passenger compartment will become too low, whereupon the heating power must be increased once more.

As can be seen from the above example, it may in some cases be very time consuming to accomplish an aimed-at temperature in the passenger compartment. This is made worse by the fact that the heated air is blown into the passenger compartment by a blower. In addition to the selected heating power, also the strength of the blower influences the temperature of the air flowing into the passenger compartment. Since users often vary the strength of the blower en route, further temperature fluctuations will be caused by the resultant change in the amount of air flowing through the heating. This makes it even more difficult to achieve a target temperature.

DE 103 17 512 discloses an air supply means for a motor vehicle in the case of which a temperature sensor is provided between a heating element arranged in the air duct and the air discharge opening. Taking into account the temperature measured by the temperature sensor, the heating power is varied in a simple way: if the measured temperature is too high, the heating power is reduced, if it is too low, the heating power is increased. However, the heating power control described in DE 103 17 512 leads to temperature fluctuations in the discharged air, in particular to overshoots beyond the aimed-at target temperature of the discharged air, which are unpleasant for the vehicle passengers.

Another drawback of the air supply means described in DE 103 17 512 is that a separate temperature sensor is required for measuring the temperature of the discharged air. Such a temperature sensor entails additional costs in the production process and increases the fault proneness.

OBJECT OF THE INVENTION

It is the object of the present invention to provide an electric auxiliary heating unit or simply "auxiliary heating" with simple temperature control and with enhanced user friendliness.

According to the present invention, this object is achieved by the features of the independent claims. Advantageous embodiments with expedient further developments of the present invention are disclosed in the subclaims.

It is the particular approach of the present invention that, instead of the hot air temperature, the temperature of the incoming cold air is detected. According to the present invention, the electric auxiliary heating comprises at least one PTC heating element which heats the air flowing through the auxiliary heating, and a control unit which adjusts the heating power generated by the heating element. For adapting the heating power to the temperature of the air to be heated, a temperature determination unit determines the cold air temperature. Based on the cold air temperature ascertained, the control unit determines the heating power to be generated by the heating element.

Due to the determination of the temperature of the incoming air to be heated, which will be referred to as "cold air temperature" in the following, the heating power to be generated can be adapted exactly to the properties of the incoming air. In this way, imminent temperature fluctuations occurring in the case of dynamic operating conditions can be detected more effectively and compensated early enough by adapting the heating power. If the air to be heated is, for example, very cold, a higher heating power will be necessary for heating said air, whereas a lower heating power will suffice to heat air which is not so cold. Since the temperature of the air discharged from the auxiliary heating depends on the cold air temperature and on the heating power, this temperature can be controlled much more effectively, so that fluctuations of the discharge temperature can be avoided.

The temperature determination unit preferably determines the cold air temperature by making use of at least one measured temperature value. In so doing, preferably at least one correction factor can additionally be used. The use of a correction factor makes it superfluous to employ a sensor, which is arranged in the air duct in front of the heating element, for measuring the temperature of the air to be heated. This temperature may rather be determined from temperature values which are made available by other components of a vehicle, such as the air conditioning system. In the recirculated air mode of the ventilation/heating, the temperature of the sucked-in air can easily be determined on the basis of the temperature in the passenger compartment of the vehicle, whereas in the flowthrough mode, in which fresh outer air flows into the vehicle, the outside temperature at the vehicle represents a good value for the cold air temperature.

For determining the cold air temperature from a temperature value detected somewhere else in the vehicle, correction factors are preferably used, said correction factors compensating the difference between the measured temperature and the actual cold air temperature. This temperature difference is often not constant when the vehicle is in operation. For taking into account this temporal variation, the temperature determination unit uses, according to a further advantageous embodiment, correction factors which correct the temporal variation of the cold air temperature relative to the measured temperature value.

Since in a vehicle travelling with an open convertible top or open windows, the outside temperature will have a significant influence on the cold air temperature of the air to be heated, the cold air temperature is preferably determined on the basis of a weighted combination of a temperature inside the vehicle and a temperature outside the vehicle.

Alternatively, the temperature determination unit according to the present invention makes use of a temperature sensor used for measuring the cold air temperature and arranged in the air intake section between a blower and the heating element. Since the cold air temperature is often not measured directly in front of the heating element, said cold air temperature may perhaps slightly change after the temperature measurement and before the air is heated. Hence, an additional correction factor is preferably used, which takes into account the deviations from the measured value.

In order to adapt the heating power to the user's wishes in an optimal way, the control unit additionally takes into account a target hot air temperature which is fixedly predetermined or which can be selected freely by the user. The heating power can be selected stepwise or continuously. The value of the target hot air temperature preferably depends on whether the vehicle is closed or open when it is en route. The target hot air temperature can easily be adapted to dynamic driving influences caused by an open convertible top or an open window. Preferably, the target hot air temperature is additionally adjusted in dependence upon the outside temperature, since the outside temperature significantly influences the temperature in the passenger compartment of the vehicle when the convertible top is open. This will be of advantage especially when the auxiliary heating is used in the neck area of a vehicle passenger. For additionally taking into account the influences of the slipstream, e.g. the influences caused by turbulences, the control unit adjusts the target hot air temperature preferably in dependence upon the vehicle speed. The target hot air temperature preferably increases continuously or stepwise if the vehicle speed increases, whereas it is reduced when the vehicle speed decreases.

In addition to the cold air temperature and the target hot air temperature, also the air mass flow, i.e. the amount of air flowing through the heating element, influences the heating power to be generated. In particular, a large air mass flow will necessitate a higher heating power so that it can be heated to a predetermined target temperature. In order to take these circumstances into account, the control unit is preferably so conceived that, for adjusting the heating power to be generated, it additionally takes into account the air mass flow through the heating element. The air mass flow can be selected stepwise or continuously. Preferably, the value of the air mass flow is adjusted automatically depending on whether the vehicle is closed or open when it is en route. The air mass flow can thus easily be adapted to influences caused by an open convertible top or an open window. This will be of advantage especially when the auxiliary heating is used in the neck area of a vehicle passenger.

When the vehicle is en route with an open convertible top, the slipstream causes turbulences which will normally be compensated by a vehicle passenger who increases the blower performance. However, if the vehicle stops abruptly, the selected blower performance will be too high so that an unpleasant excessive heating effect, which is not desired by the vehicle passenger, may occur. In order to avoid this, the air mass flow is preferably adjusted to a preselectable value on the basis of a signal indicative of the stationary condition of the vehicle.

For additionally taking into account the influences of the slipstream also while the vehicle is en route, the control unit adjusts the air mass flow preferably in dependence upon the vehicle speed. The air mass flow will preferably increase as the vehicle speed increases, whereas it will be reduced when the vehicle speed decreases.

If the target hot air temperature and/or the air mass flow change while the auxiliary heating is in operation, the heating power to be generated will have to be adapted. If, for example, the target hot air temperature is increased, the heating power which has been determined to be necessary for heating the air to the new desired target temperature of the discharged air will, due to the inertia of the PTC heating elements, not immediately be fully transferred to the air to be heated. In order to compensate this inertia effect, the control unit will preferably overcompensate (increase or reduce) the heating power to be generated in the case of a change in the target hot air temperature and/or the air mass flow for a predetermined period of time after the moment of change, i.e., depending on the change of the target hot air temperature/air current, a heating power value which is higher or lower than the value actually provided for the target hot air temperature/air current will be chosen during the predetermined period of time. The overcompensation of the heating power change is preferably executed for a predetermined period of time (or for a period of time depending e.g. on the magnitude of the change). The degree of overcompensation can decrease towards the end of said period of time so as to achieve a continuous transition.

In order to prevent undesirable consequences of a blocked air outlet or inlet or of a failure of the blower supplying the heating with air, the control unit preferably takes into account the voltage applied to the blower. A decrease in the voltage applied to the blower clearly indicates that the air outlet or inlet is blocked. Hence, the control unit will reduce the air mass flow through the auxiliary heating, if the voltage drops below a limit value.

Likewise, the current measured across the heating element is indicative of a problem in the air current, since, if the air current is disturbed, the current value will decrease (PTC effect). Hence, the control unit will preferably deactivate the heating element, if the current measured across the heating element drops below a predetermined limit.

Since the parameters required for determining the heating power to be generated, such as the heating characteristics of the heating element or the vehicle-dependent influences, are often not theoretically known, the auxiliary heating preferably uses a characteristic field which describes the properties of these parameters. The control of the auxiliary heating can be effected by a combination of mathematical formulae and of the characteristic field. The control unit may also execute the adjustment of the heating power completely by means of characteristic fields.

In order to reduce the wiring expenditure for connecting the auxiliary heating to other components of a vehicle, the signals supplied by said components are preferably made available via a bus system in the motor vehicle.

Making use of the present invention, an electric auxiliary heating can easily be used anywhere in a motor vehicle as a self-sufficiently operating auxiliary heating. Said auxiliary heating is therefore particularly suitable for effecting local heating and it can be mounted at arbitrary positions of use, e.g. in vehicle seats, in the rear of the passenger compartment, in the floor room, in the B or C columns of a motor vehicle. Especially the precise determination of the heating power to be generated allows the use of the auxiliary heating in close vicinity to the vehicle passengers. The auxiliary heating is therefore preferably provided in a vehicle seat which supplies the seat, back or neck area of a passenger with hot air.

Other advantages, features and details of the present invention can be seen from the description of preferred embodiments following hereinbelow and from the figures, in which:

DETAILED DESCRIPTION OF THE PREFERRED EMBODIMENT

Figure 1:
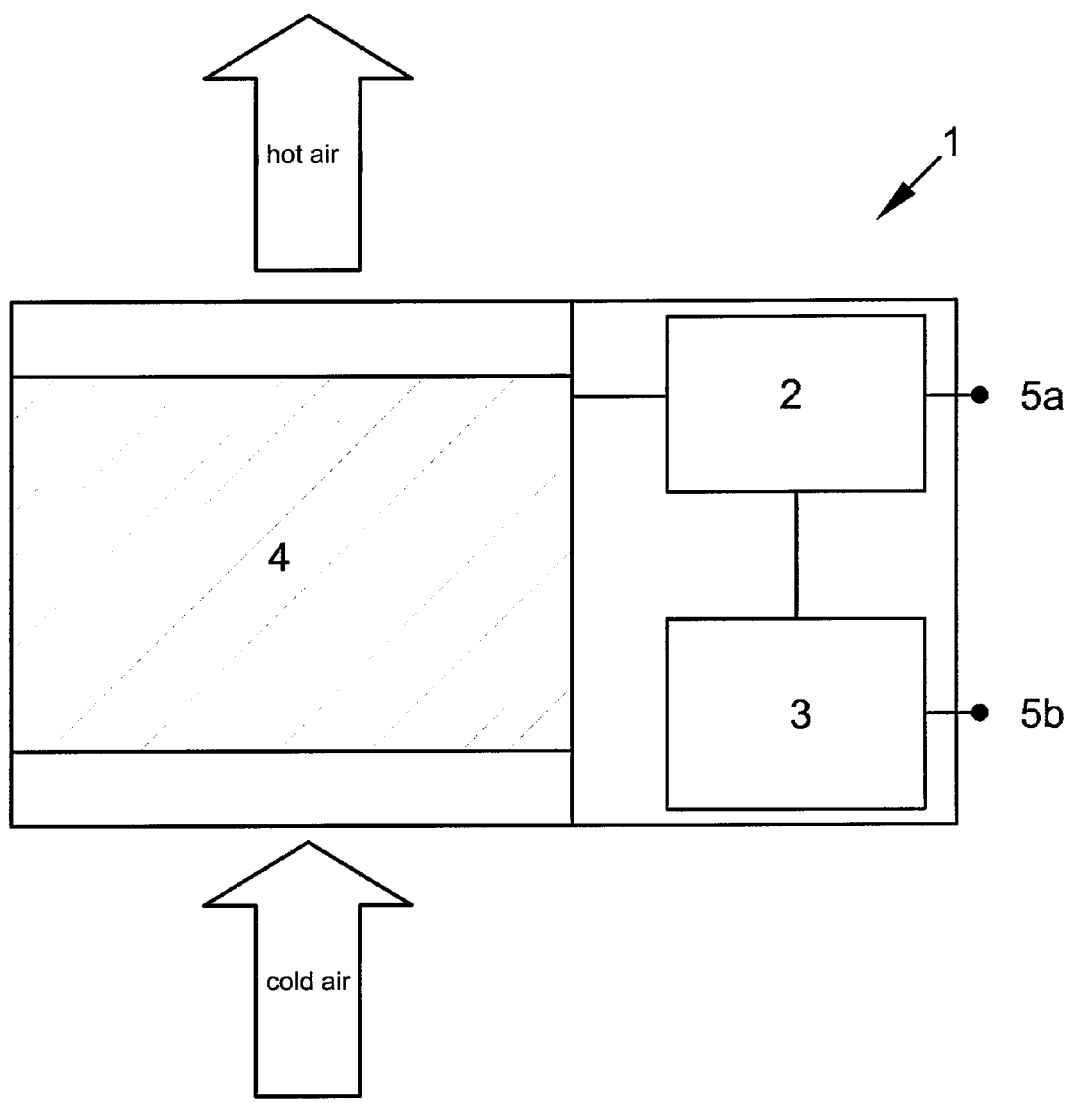
FIG. 1 shows a schematic structural design of the electric auxiliary heating according to the present invention.

FIG. 1 shows the schematic structural design of an electric auxiliary heating unit or simply "auxiliary heating" according to the present invention. The auxiliary heating 1 comprises a control unit 2, a temperature determination unit 3 and a heating section comprising one or a plurality of PTC heating elements and radiator elements for transferring the heating power to the air flowing through the radiator elements. The temperature determination unit 3 is connected to the control unit 2 and supplies to said control unit a temperature value which reflects the temperature of the cold air incident on the heating element 4. On the basis of the resultant temperature value, the control unit 2 controls the heating power of the PTC heating element.

For connecting the auxiliary heating 1 with other components in a vehicle, the auxiliary heating 1 is provided with terminals 5a and 5b. Making use of the terminal 5b, e.g. the temperature determination unit 3 can be connected to a temperature sensor provided in or on the vehicle. It is also possible to influence the behaviour of the control unit via the terminal 5a. This terminal can e.g. be used for transmitting user-defined predetermined specifications or signals of other vehicle components to the control unit 2.

The auxiliary heating 1 can be connected to external devices of the vehicle directly in an analog or digital fashion. In this case, a high expenditure of cables will, however, be necessary, since each external device must be connected separately to the auxiliary heating 1. In order to avoid this problem, it becomes increasingly common to use a bus, e.g. a CAN or LIN bus, in vehicles. This bus transmits the signals of a plurality of devices to other devices of the vehicle by means of a single line. Making use of the terminals 5a and 5b, the auxiliary heating 1 can easily be connected to such a data bus and further process the signals received via the bus. For example, the temperature determination unit 3 can receive via said bus a temperature value of an air conditioning system installed in the vehicle or of a sensor provided in the air duct, and determine the cold air temperature of the air incident on the heating element 4.

Likewise, it is also possible to update or service the control unit 2 and the temperature determination unit 3 via the terminals 5a and 5b. The person skilled in the art is, however, aware of the fact that the above-described use of the terminals is only an example and that the terminals offer a large number of possibilities of influencing the auxiliary heating. Nor is it necessary to provide the auxiliary heating with two separate terminals. The auxiliary heating may e.g. comprise only one terminal 5a which is connected to the control unit 2 and through which the control unit 2 is supplied with data. In this case, the data required by the temperature determination unit 3 are—if necessary—advanced by the control unit 2 to the temperature determination unit 3.

Figure 2:
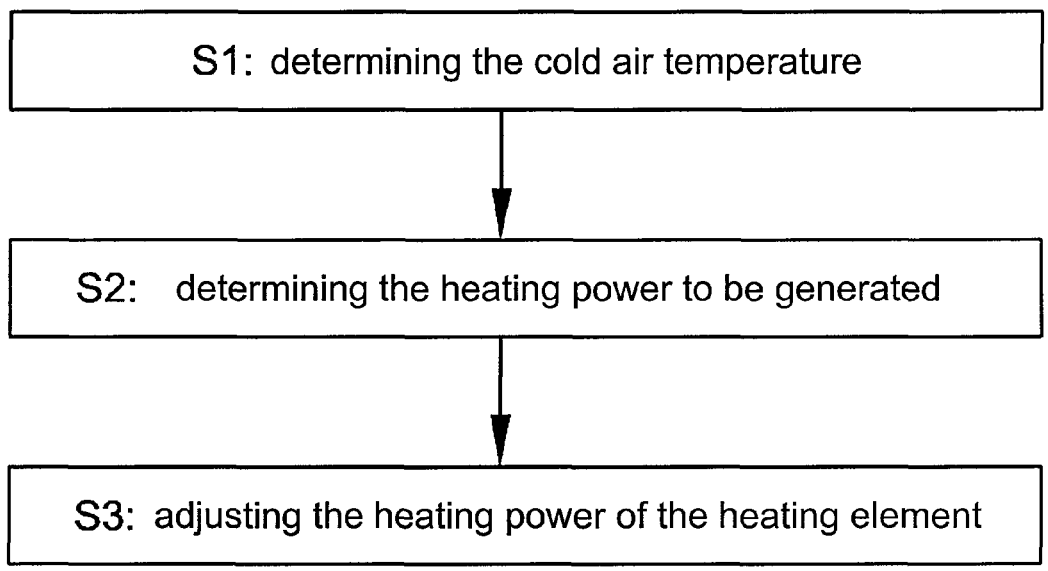
FIG. 2 shows a flowchart which illustrates the principle of the control of the electric auxiliary heating according to the present invention.

FIG. 2 shows a flowchart which illustrates the basic principle of the control of the auxiliary heating 1. In the first step S1, the cold air temperature of the air to be heated is determined. This determination can be accomplished in various ways. The most simple way of determining this temperature is a determination by means of a sensor which is arranged in the incoming cold air; if a blower is used, said sensor is preferably arranged in the air duct between the blower and the heating element. This course of action is advantageous insofar as the cold air temperature can be determined precisely by such a sensor. An additional sensor is, however, necessary in this case, whereby the auxiliary heating will become more expensive.

The cold air temperature is therefore preferably determined on the basis of temperature values which have already been detected in the vehicle, e.g. the temperature in the passenger compartment of the vehicle, a temperature measured by the air conditioning system, or the like. In this case, no additional temperature sensors are necessary for determining the cold air temperature, but the devices which are already integrated in the vehicle can be used without any extra costs. Details of such an "indirect" detection of the cold air temperature will be explained precisely in one of the paragraphs following hereinbelow.

On the basis of the cold air temperature ascertained in this way, the heating power to be generated by the heating element 4 is determined in step S2. This heating power depends to a significant extent on the temperature of the air incident on the heating element. The heating power required for heating cold air is, for example, higher than the heating power required for heating air which is not so cold.

The heating power required can be ascertained in various ways. This can be done e.g. by means of algorithms (i.e. by solving mathematical equations) which describe the dependence of the heating power on the cold air temperature. It is also possible to use a characteristic which reflects the dependence of the heating power on the cold air temperature and on other parameters. In this case, the computing effort for determining the heating power can be avoided. The person skilled in the art is, however, aware of the fact that there are also other possibilities for determining the necessary heating power and that the above-mentioned methods are only examples.

When the heating power to be generated has been ascertained, the heating power of the heating element 4 is adjusted in step S3. This can easily be accomplished through a suitable selection of the strength of the current flowing through the heating element (or through a plurality of preferably separately controllable PTC heating elements). Depending on the number of separately controllable heating stages of the auxiliary heating, power semiconductors, which adjust the current to be supplied to each heating stage, are normally used for this purpose.

By means of the control according to the present invention, the heating power emitted by the heating element 4 to the air to be heated is adjusted to the cold air temperature of the incoming air. Other than in the case of the prior art, the heating power can be adapted in an optimal way, without disadvantageous control overshoots, even in the case of dynamically varying ambient conditions. Unpleasant excessive temperatures of the heated air current can reliably be avoided in this way.

Figure 3:
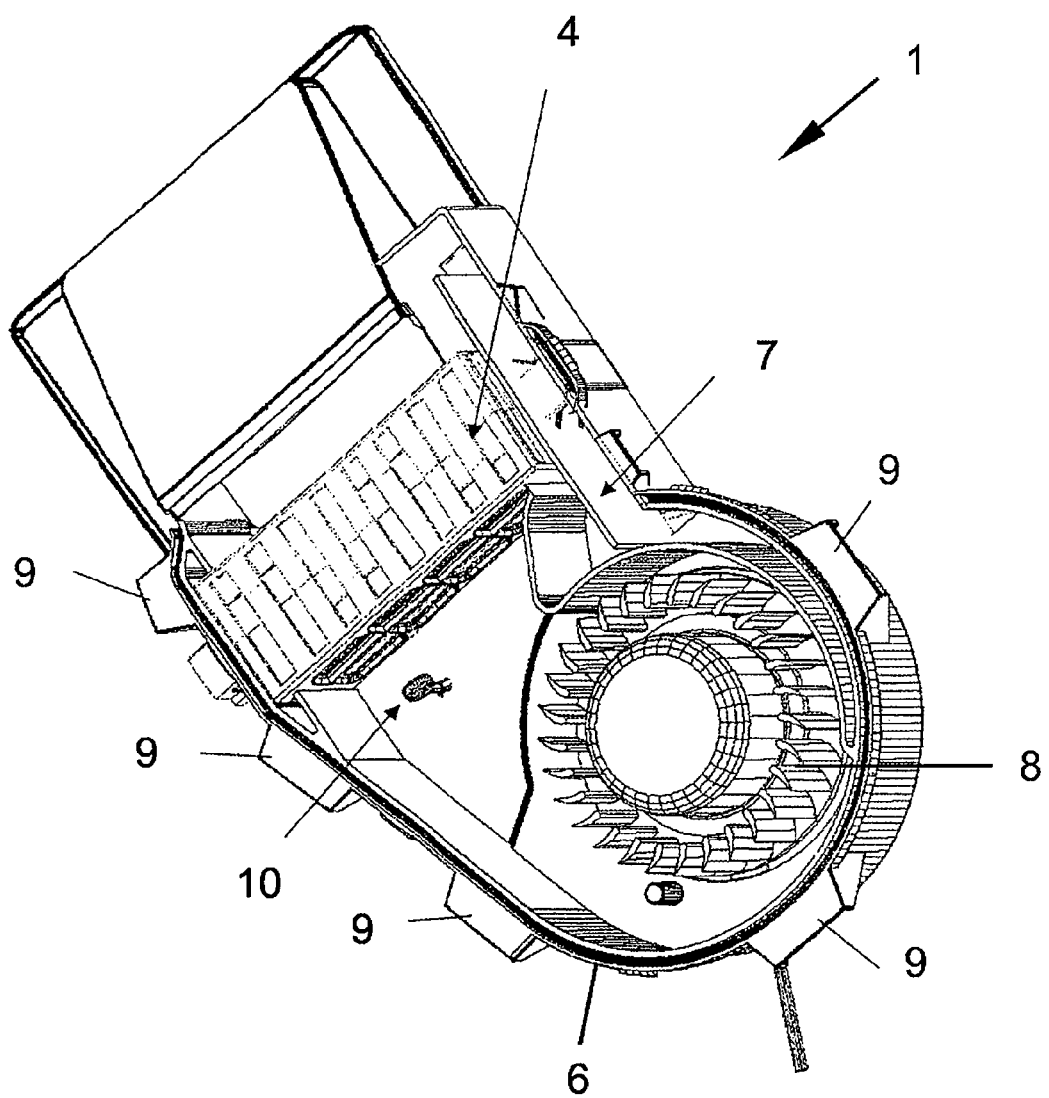
FIG. 3 shows a structural design of the electric auxiliary heating according to the present invention with an integrated blower.

FIG. 3 shows in detail an electric auxiliary heating according to the present invention with an additional blower which—according to an embodiment of the present invention—is provided with a temperature sensor for measuring the cold air temperature. As has been described hereinbefore, the use of such a temperature sensor is, however, not absolutely necessary.

The auxiliary heating 1 consists of a flat box 6 having arranged therein side by side a heating element 4, a circuit board with an electronic control 7 having integrated therein the control unit 2 and the temperature determination unit 3, a radial blower 8 and a temperature sensor 10. A number of mounting links 9 is additionally provided on the outer circumference of the box 6, said mounting links 9 being used for connecting the box 6 to complementary counterparts in the vehicle support body. The temperature sensor 10 is provided in the cold air section and connected to the electronic control 7. Furthermore, the electronic control 7 is connected, via lines which are not shown in detail, to the wiring system of the vehicle, the radial blower 8, or to suitable control elements which are preferably provided in the area of the seats or fittings. These control elements can e.g. be used for adjusting the hot air temperature and/or the rotational speed of the blower independently of one another. Furthermore, the control 7 can be connected to a vehicle bus, in addition to or instead of the temperature sensor 10, said bus supplying to the control 7 ambient parameters available in the vehicle, such as the internal temperature, the outside temperature, the vehicle speed, the condition of the convertible top (open/closed), etc.

FIG. 3 illustrates clearly the many possibilities of using the present invention. Auxiliary heatings of the type shown in FIG. 3 are used at many locations in the vehicle. Auxiliary heatings are, for example, installed in the dashboard or in the area of the seating surface, backrest and neckrest of vehicle seats. Moreover, modern vehicles comprise a plurality of blower or heating modules so as to enhance the comfort. In view of the fact that the present invention determines the temperature of the incident air separately for each individual one of the heating elements integrated in the vehicle, each heating element can operate self-sufficiently and can therefore be used locally.

Figure 4:
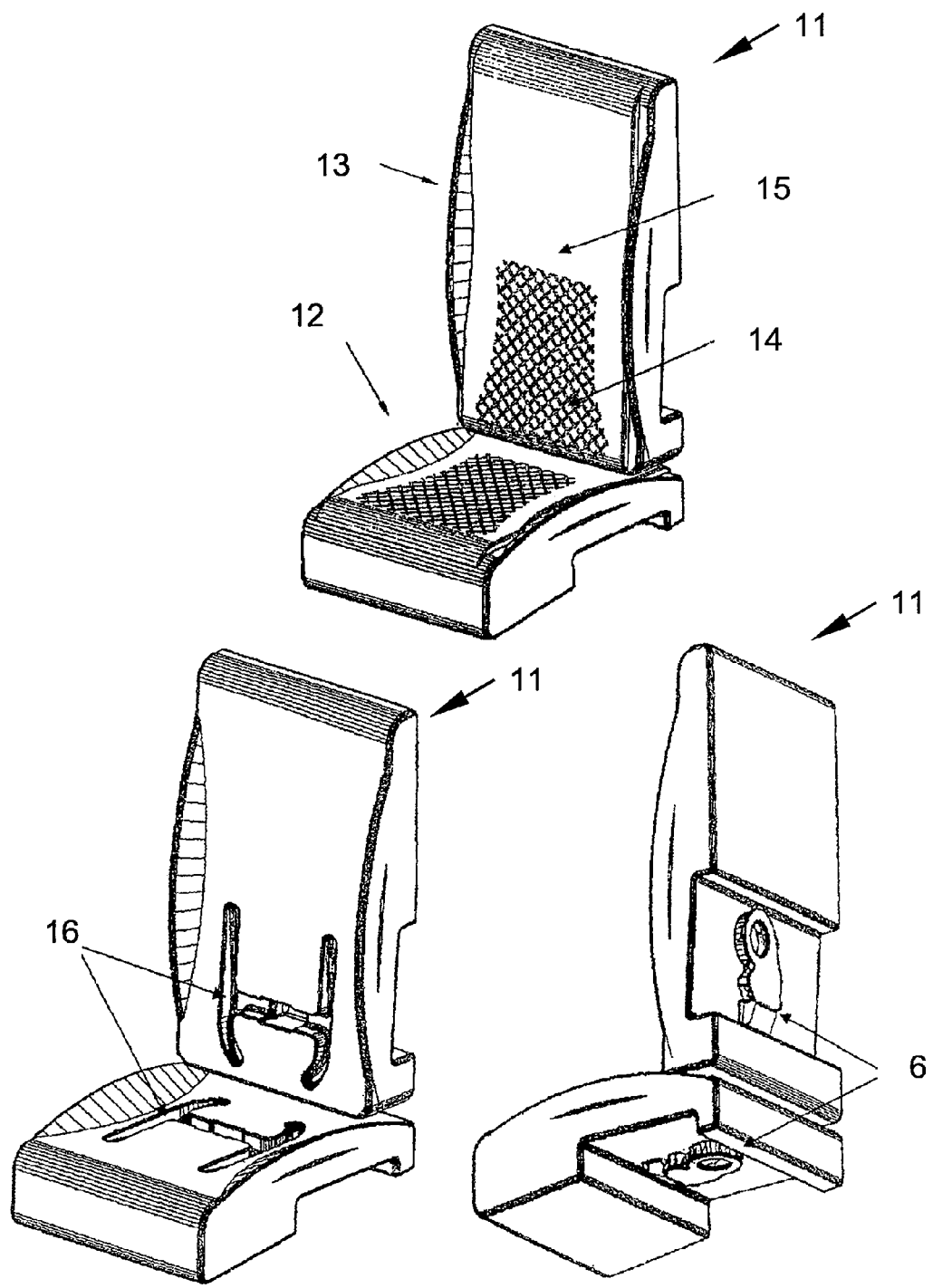
FIG. 4 shows a vehicle seat having an auxiliary heating installed therein.

One possible embodiment of the use of the auxiliary heating according to the present invention for heating a vehicle seat is shown in FIG. 4. The vehicle seat comprises, as is usually the case, a seat cushion part 12 and a backrest 13. Both the seat cushion part 12 and the backrest 13 consist essentially of a support body; it will be particularly advantageous when this support body is made of rigid foam, e.g. polyurethane, but it may also be implemented as an innerspring seat; said support body has integrated therein the necessary fixing rails and frames. The surface of the rigid foam has glued thereon e.g. a knitted fabric 14 on which the outer cover 15, e.g. velour or leather, lies.

In the embodiment shown in FIG. 4, air flow passages 16 are provided in the rigid foam, said air flow passages 16 terminating in a chamber and being open towards the knitted fabric 14 along their entire lengths. At the back of the seat cushion part and of the backrest 13, auxiliary heatings 6 are placed in openings provided for this purpose. The air heated by the auxiliary heatings is advanced through the air flow passages 16 to the vehicle passengers. Although FIG. 4 only shows heatings for the seat cushion part and the backrest part of the seat, the auxiliary heating according to the present invention can equally be used in seats including an air flow passage (or a plurality of air flow passages) for warming the neck area of the vehicle passenger. In this case, not only one, but e.g. three auxiliary heatings may be used, the respective auxiliary heatings supplying the seat, back or neck area of the person occupying the seat with hot air.

When a plurality of auxiliary heatings is used in a vehicle, it will, however, not be necessary to provide each individual heating element 4 with an electronic control 7. For reducing the costs, the vehicle can be provided with only one electronic control which is connected to the individual heating elements, e.g. via a bus or in an analog manner, and which individually adjusts the heating power to be generated by the respective heating element.

Nor is it necessary that each individual heating element is connected to a separate blower 8. For reducing the costs and the vehicle weight, a plurality of heating elements can be connected to a single blower 8 which supplies air to the respective heating elements. The auxiliary heating according to the present invention can, for example, be arranged in air ducts used for conducting air from a central blower to air vents which are arranged further back in the vehicle. An individual blower is not necessary in such cases. In addition, the vehicle seat may comprise only one or a plurality of air ducts, which are connected to an external blower and which have provided therein one or a plurality of auxiliary heatings according to the present invention. The parameters of the cold air current supplied to the heating can be provided e.g. by the central air conditioning system.

As has already been mentioned hereinbefore, the heating power to be generated depends significantly on the cold air temperature of the air incident on the heating element 4. The heating power to be generated can be determined by different methods, e.g. by mathematical equations containing the cold air temperature as a control quantity. This mathematical computing effort can be avoided when characteristics or characteristic fields are used. In the case of this method for determining the heating power, characteristics are determined, e.g. experimentally by measurements at the auxiliary heating, said characteristics reflecting the dependence of the heating power on the cold air temperature and allowing an optimum adjustment of the heating power, during operation.

The two determination methods may also be combined so as to improve the temperature determination. For example, subaspects of the mathematical computation, such as the temperature dependence of parameters, can easily be represented by characteristic fields. This will significantly reduce the computation effort, since precise formulae for the properties of the parameters do often not exist. The use of characteristics also has the advantage that characteristics can be updated, if necessary. By redetermining the characteristics, it will, for example, be possible to optimize the determination of the cold air temperature if improved measurement methods are used. This allows, in addition, an adaptation of the control of the heating power to varying properties of the auxiliary heating, e.g. to a possible soiling of said auxiliary heating.

For executing the functions described hereinbefore, e.g. the control unit 2 and/or the temperature determination unit 3 may comprise a memory unit (not shown) containing control programs, function routines or characteristics, which define the temperature determination and the control of the heating element. In addition, one of said units or both said units include, in this case, a processor which executes the programs stored in the memory unit. The data contained in the memory units can also easily be updated via the terminals 5a and 5b. The person skilled in the art is, however, aware of the fact that also other realizations are possible for executing the functions of the auxiliary heating.

In the following, the mathematical method of computing the heating power to be generated will first be presented. The basis for this method is the following formula:

$$P = \dot{m} \cdot c_P \cdot \Delta T. \quad \text{(i)}$$

wherein P is the is the heating power to be generated, $\dot{m}$ is the air mass flow through the auxiliary heating 1, $c_P$ is the heat capacity of the air, and $\Delta T := T_{discharge} - T_{cold}$ is the difference between the target hot air temperature $T_{discharge}$, i.e. the desired temperature of the discharged hot air, and the cold air temperature $T_{cold}$.

In the simplest embodiment of the auxiliary heating, the target hot air temperature and the air mass flow are fixedly predetermined values so that the heating power to be generated only depends on the cold air temperature which may perhaps vary. For taking into account the efficiency with which the air flowing through takes up heat energy, an efficiency factor α can additionally be taken into account. In this case, the formula for computing the heating power is as follows:

$$P = \alpha \cdot \dot{m} \cdot c_P \cdot \Delta T. \quad \text{(ii)}$$

The cold air temperature required for computing the heating power can be determined in several ways. The easiest way of realizing this is the use of a temperature sensor which is arranged between the blower and the heating element and which measures the temperature of the air incident on the heating element. The use of such a sensor is, however, not necessary, since a large number of devices installed in the vehicle measure temperatures in or on the vehicle, which can be used for determining the cold air temperature. For example, an air conditioning system installed in the vehicle measures a temperature which allows conclusions to be drawn about the temperature in the interior of the vehicle. When the blower, which supplies air to the auxiliary heating, sucks in air from the passenger compartment of the vehicle, e.g. in the recirculated air mode, the temperature measured by the air conditioning system represents a good value for the cold air temperature. When the air supply is operated in the flowthrough mode, the air sucked in is not air from inside the vehicle but fresh air from outside. In this case, the outside temperature measured by a temperature sensor provided on the vehicle will be a good measure for the cold air temperature. Starting from this observation, the present invention uses an ambient temperature $T_{ambient}$, which is measured by a temperature sensor within or on the vehicle, for determining the cold air temperature.

Since the ambient temperature (in or on the vehicle) does normally not precisely correspond to the cold air temperature (suck-in temperature), a factor F, which assesses the quality of a temperature provided by e.g. a bus (e.g. the internal temperature or the external temperature), can additionally be introduced in the calculation. For example, if the temperature provided by the bus need not be adapted, F=1 can be chosen. The quality factor, which reflects e.g. temperature differences between the temperature measured and the actual temperature of the cold air, is used for correcting the ambient temperature so as to obtain the cold air temperature:

$$T_{cold} = F \cdot T_{ambient}. \quad \text{(iii)}$$

In formula (iii) is it assumed that the ratio between the ambient temperature and the cold air temperature can be determined through a factor. Such an unequivocal dependence is, however, not always given. It is also possible that the cold air temperature always differs from the ambient temperature by a specific differential value. For taking into account such a relationship between the ambient temperature and the cold air temperature, the present invention alternatively uses an additive correction factor f, as shown in the following formula:

$$T_{cold} = T_{ambient} + f. \quad \text{(iv)}$$

For additionally taking into account a temporal variation of the deviation of the ambient temperature from the cold air temperature, the correction factors may also be time-dependent. Such a time dependence will, for example, occur if the ambient temperature is measured e.g. at the dashboard or at the centre console, which are heated to a certain temperature within a very short period of time, whereas the air is sucked in e.g. in the vicinity of the floor of the passenger compartment, the temperature of said air rising only slowly to the temperature of the console. The cold air temperature can also be determined as follows by combining the correction factors F and f:

$$T_{cold} = F(t) \cdot T_{ambient} + f(t). \quad \text{(v)}$$

Up to now, the cold air temperature has been determined on the basis of only one temperature measured in or on the vehicle. The determination of the cold air temperature can, however, be improved by using a plurality of temperatures.

For determining the cold air temperature from a plurality of temperatures, weighting factors and/or correlation factors are used, which express the influence of the individual temperatures on the cold air temperature. The sum of these factors is preferably 1. These correlation factors can be temporally constant as well as temporally variable. This allows an assessment of the quality of the values provided by the vehicle.

A correlation/weighting is exemplarily described hereinbelow on the basis of a combination of a measured passenger compartment temperature and the outside temperature.

When a vehicle is started and/or a heating module switched on, an adjustment between internal and external temperatures will normally take place. If, for example, a passenger compartment temperature of 18° C. prevails in the vehicle with the convertible top or the windows closed, whereas the outside temperature is 10° C., the temperatures will be adjusted to a value between these two temperatures when the convertible top or a window is opened; this last-mentioned value is assessed.

The temperature of the air to be heated can be determined by the following formula:

$$T_{cold} = F_{external}(t) \cdot T_{external} + F_{internal}(t) \cdot T_{internal}. \quad \text{(vi)}$$

As can be seen, the influence of the external and internal temperatures is taken into account by selecting suitable correction factors which are time-dependent in the above example. An additive correction factor, which reflects further variations, can additionally be added.

The above-mentioned formulae include a large number of correction factors for the mathematical description of which precise functions are often not known. In particular, the exact values of the correction factors are vehicle-specific and they may change as the vehicle and the auxiliary heating age. In order to use for the correction factors nevertheless precise values or the time-dependence of the factors, the temperature determination unit 3 preferably stores characteristics which represent the dependence of the individual factors. These characteristics or characteristic fields are empirically determined by series of measurements. Individual values can thus be determined for each vehicle type, whereby the control of the heating power can be adapted to the vehicle in an optimal way.

As can be seen from formula (i), the heating power to be generated depends not only on the cold air temperature but also on the hot air temperature, which is constant in the simplest embodiment of the auxiliary heating 1. However, such an auxiliary heating does often not suffice to satisfy the vehicle passenger's need for comfort. In particular, vehicle passengers find it important that they have the possibility of adapting the temperature of the air discharged from the heating to their own need for comfort.

In order to satisfy this need, the control unit of the auxiliary heating additionally takes into account a target temperature value according to a further embodiment of the present invention, said target temperature value being ascertained on the basis of a value received from an external input unit via terminal 5a.

The target temperature value can be determined in various ways from the signal received. Most simply, the value transmitted by the external device corresponds to the exact temperature value inputted by the user. In this case, the temperature can be varied and adjusted continuously by the vehicle passenger. In many cases, the vehicle passenger will, however, not precisely predetermine a target temperature but only select a comfort stage corresponding to a certain temperature. In this case, the temperature value transmitted to the control unit may perhaps be not the exact temperature value, but only a value reflecting the comfort stage selected. For determining the hot air target temperature from the value transmitted, the memory of the control unit may also have stored therein a table containing the individual target temperatures in dependence upon the signal received.

In addition to the cold air temperature and the target hot air temperature also the air mass flow which flows through the heating element is important for the heating power to be generated. In the simplest embodiment of the auxiliary heating, this air mass flow is chosen such that it is constant, but such an embodiment does often not suffice to satisfy the vehicle passenger's need for comfort.

In order to satisfy this need, the control unit 2 of the auxiliary heating 1 according to a further embodiment of the present invention takes into account an air mass flow which is ascertained on the basis of a value received from an external input unit via a terminal 5a.

Since the exact value of the air mass flow is of little use to vehicle passengers, the vehicle passenger will not precisely preselect the air mass flow, but only adjust a comfort stage corresponding to a certain air mass flow. Just as in the case of the selection of the target hot air temperature, the value transmitted to the control unit 2 may in this case perhaps not be the exact value of the air mass flow, but only a value that reflects the selected comfort stage. This value can originate e.g. from the blower 8 or directly from a user-operable controller. Depending on the nature of the value transmitted, the air mass flow flowing through the auxiliary heating 1 is ascertained. If the exact value is transmitted, said value can directly be inserted in formula (i). If, however, the value transmitted only expresses the comfort stage selected or if it indicates the rotational speed of the blower, the air mass flow may also be ascertained from the transmitted value by means of a table which is stored in the memory of the control unit and in which the dependence of the air mass flow on the signal received is described.

It will, however, be of advantage to take into account not only a user-defined comfort stage but also parameters such as the vehicle speed or the outside temperature for determining the target hot air temperature and the air mass flow. These parameters are of great importance in open vehicles, such as cabriolets, or when the windows or the sun roof are open.

In the open condition of the convertible top or of the windows, turbulences are caused by the slipstream in the interior of the vehicle. These turbulences have a negative influence on the hot air current discharged by the heating. On the one hand, the slipstream may influence the speed of the discharged air, and, on the other hand, the cold wind cools down the discharged air masses. Both effects depend primarily on the speed of the vehicle.

In the following, two embodiments of the present invention are described, which take into account the influences of the slipstream in the non-closed condition of the passenger compartment.

As has been described hereinbefore, the slipstream chills the air discharged from the auxiliary heating. Hence, the air no longer has the desired temperature when it reaches the vehicle passenger. In order to counteract such chilling, the present invention varies, according to a preferred embodiment, the target hot air temperature in dependence upon the vehicle speed. This variation is chosen such that the chilling caused by the slipstream is compensated.

Since the wind becomes colder and colder as the vehicle speed increases, the target hot air temperature is preferably chosen such that it increases as the vehicle speed increases. Likewise, the target hot air temperature is reduced as the vehicle speed decreases. The easiest way of realizing this is to demand a linear dependence of the target hot air temperature on the vehicle speed, but a non-linear dependence of the target hot air temperature on the vehicle speed may be used as well. In addition to a continuous variation of the hot air temperature in dependence upon the vehicle speed, said variation may also take place stepwise.

For varying the target hot air temperature, it is also possible to assign to the respective vehicle speeds suitable temperature corrections instead of absolute temperature values; this can be done by using e.g. a mathematical function that indicates the degree to which a preselected target hot air temperature is to be increased or decreased. Alternatively, it is also possible to store in the control unit a characteristic field comprising virtual target hot air temperatures in dependence upon the vehicle speed and the comfort stage. Table 1 shows an exemplary characteristic field in which target hot air temperatures for three comfort stages and four different speeds are inserted. The value of the target hot air temperature in the stationary condition of the vehicle can so to speak be regarded as a basic value which is adapted in dependence upon the vehicle speed.

TABLE 1 dependence of the target hot air temperature on the vehicle speed and the comfort stage.
speed dependence of the target hot air temperature

| vehicle speed | 0 km/h | 50 km/h | 90 km/h | 140 km/h |
|---|---|---|---|---|
| stage 1 | 25° C. | 30° C. | 35° C. | 40° C. |
| stage 2 | 30° C. | 35° C. | 40° C. | 45° C. |
| stage 3 | 35° C. | 40° C. | 45° C. | 50° C. |

Since the "chilliness" of the slipstream also depends on the outside temperature, a further embodiment of the present invention is so conceived that the target hot air temperature is additionally adapted to the outside temperature, so that a lower outside temperature will automatically result in the selection of a higher target hot air temperature. The outside temperature-dependent target hot air temperature can be indicated by an absolute temperature value. It is, however, also possible to use relative temperature values which indicate how a predetermined target hot air temperature is to be corrected in dependence upon the outside temperature. In this respect, it should be taken into account that the various temperature corrections, e.g. for adapting the target hot air temperature to the vehicle speed or the outside temperature, can be combined with one another so that the target hot air temperature can adapted to various parameters simultaneously.

The slipstream leads not only to lower temperatures of the air discharged from the heating, but also to a reduction of the intensity of the air discharged. In order to counteract this change in the air current, the vehicle passenger will normally increase the intensity of the air current when the vehicle speed increases. If the speed is, however, reduced rapidly, the driver will not be able to reduce the air current within a sufficiently short period of time so that the air current blowing onto his neck will be too strong. For preventing possible unpleasant consequences of an abrupt stoppage of the vehicle, the present invention reduces the intensity of the air mass flow in dependence upon a halt signal indicating that the vehicle stands still. It is, however, not absolutely necessary that the halt signal is only produced in the case of an exact standstill of the vehicle, but the halt signal may also indicate that the vehicle speed is below a specific limit value so that stoppage of the vehicle has to be expected in the near future.

In order to counteract such a variation of the air current also as long as the vehicle is en route, the air mass flow is preferably varied in dependence upon the vehicle speed. This variation is chosen such that the changes caused by the slipstream are compensated by varying the rotational speed of the blower, so that the air mass flow will increase when the vehicle speed increases and decrease when the vehicle speed decreases. Since the air mass flow is adapted to the vehicle speed as long as the vehicle is en route, a signal indicating the standstill of the vehicle can in this case be dispensed with. The adaptation of the air mass flow can be executed by the control unit 2 by means of which the heating power to be generated is additionally automatically adapted to the changed air mass flow. It is, however, also possible that some other control unit in the vehicle varies the rotational speed of the blower in dependence upon the vehicle speed and that the control unit 2 automatically adapts the heating power in accordance with this adaptation.

The rotational speed can be varied in different ways. The variation can, for example, be predetermined by using a continuous linear or non-linear mathematical function which assigns to the vehicle speeds respective rotational speeds of the blower on the basis of which the air mass flow can be calculated. Instead of a continuous variation, the air mass flow can also be adapted stepwise to the vehicle speed. Alternatively, the control unit can have stored therein a characteristic field comprising rotational speeds in dependence upon the vehicle speed and the comfort stage. Table 2 shows an exemplary characteristic field in which various rotational speeds of the blower for three comfort stages and four different vehicle speeds are listed.

TABLE 2 dependence of the rotational speed of the blower on the vehicle speed and the comfort stage.
speed dependence of the rotational speed of the blower

| vehicle speed | 0 km/h | 50 km/h | 90 km/h | 140 km/h |
|---|---|---|---|---|
| stage 1 | 1600/min | 2200/min | 2700/min | 3000/min |
| stage 2 | 1800/min | 2400/min | 2850/min | 3000/min |
| stage 3 | 2000/min | 2550/min | 3000/min | 3000/min |

Although the characteristic field shown in table 2 reflects a stepwise variation of the rotational speed of the blower, a continuous adaptation of the rotational speed of the blower to the vehicle speed can be achieved e.g. by interpolation between the stored values. In this respect, it should be taken into account that the rotational speeds are independent of the outside temperature.

In addition, it is also possible to use correction values instead of absolute rotational speed values of the blower, said correction values indicating the degree to which a preselected rotational speed of the blower is varied in dependence upon the vehicle speed.

Although the speed-dependent adaptation of the target hot air temperature has been described separately, it will be of advantage when the variation of the target hot air temperature and a change of the rotational speed of the blower are both taken into account by the auxiliary heating upon determining the heating power, as has been described hereinbefore. It is, however, not absolutely necessary that both corrections are executed.

It may in certain cases not be possible to theoretically determine the above-described mathematical function or characteristic fields, which will then have to be determined empirically. Also a combination of a mathematical function and a stored characteristic field can be used for adapting the target hot air temperature.

In both above-described embodiments, the target hot air temperature and the rotational speed of the blower are decisively determined by the speed of the vehicle. The vehicle speed can be determined in various ways. For example, a tachometer signal can be supplied to the control unit 2. Alternatively, the speed can also be determined on the basis of the wheel speed or the gear rotation speed or on the basis of the antilock brake system. In addition, the control unit 2 can receive a signal which indicates the exact speed value, or a value which indicates e.g. a speed and from which the vehicle speed is derived by means of functions or tables stored in the control unit 2. Moreover, an explicit determination of the speed from speed-dependent parameters, such as the wheel speed, is not necessary. It is also possible to use functions or characteristic fields which describe how the heating power to be generated directly depends on the parameters.

As can be seen from the above-described embodiments and formulae, a variation of the comfort stage and of the vehicle speed, respectively, leads to a corresponding variation of the heating power to be generated, but, due to the inertia of the PTC elements, the change of the heating power does not have an immediate effect on the temperature of the discharged air.

For example, due to the typical behaviour of PTC ceramics, the surface temperature of the heating elements increases rapidly in the case of a reduction of the air mass to be heated (e.g. reduced rotational speed of the blower). This results in an unpleasant "excessive heating effect" which is not desired by the vehicle passenger. This should be avoided, especially when the auxiliary heating is used as a head space heating. In addition, the unavoidable thermal inertia of the heating element normally causes a delay in the change of temperature of the heated air.

In order to compensate this inertia and excessive heating effects, a further preferred embodiment of the present invention is so conceived that, when the power to be generated by the heating element changes, the heating power generated by the heating element 4 is controlled such that it will initially deviate from the calculated target value for a certain period of time.

Figure 5:
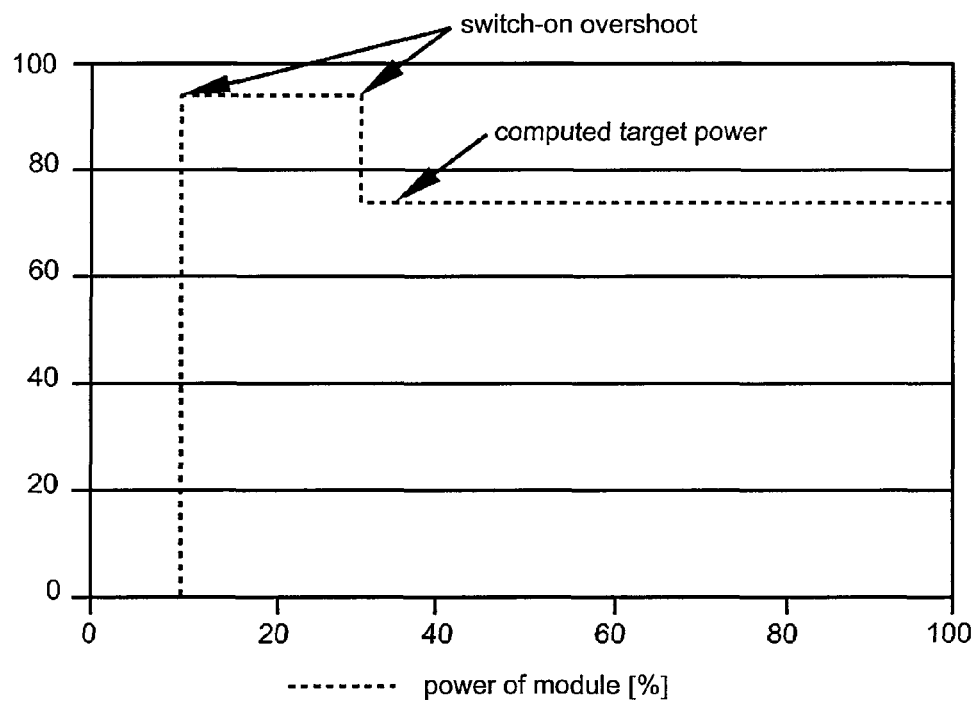
FIG. 5 shows a variation over time of the heating power absorption of the auxiliary heating according to the present invention in the case of a change of load.

FIG. 5 shows an exemplary time-dependent characteristic of the heating power generated by a heating element 4 in the case of an increase in the air current intensity and a resultant increase in the heating power to be generated. In order to heat the discharged air more rapidly and in order to compensate the inertia of the heating element, the heating element is, in response to a positive change of load, e.g. a selection of a higher comfort stage, temporarily supplied with a heating energy which is higher than that associated with the current vehicle speed. By selecting a higher heating power, it is achieved that, in spite of the inertia, the air will be heated as desired.

Likewise, the control unit 2 is configured such that, in response to a negative change of load, e.g. the selection of a lower comfort stage, the heating energy chosen for the heating element is lower than the heating energy set for the respective vehicle speed. This selection of a lower heating power will prevent a possible rise in the blow-out temperature, which may be caused by the energy stored in the thermal mass of the heating element in connection with a lower air flow rate. It follows that, due to the fact that the heating power to be generated is reduced in the case of a negative change of load, an overshoot of the blow-out temperature and a resultant excessive heating effect are avoided.

The heating element or elements are preferably controlled through pulse width modulation (PWM). The heating power is adjusted via the duty cycle. When a change of load takes place, this duty cycle is either increased (in the case of a positive change of load, when switching to a higher comfort stage takes place) or decreased (in the case of a negative change of load, i.e. when switching to a lower comfort stage takes place) for a short period of time. A theoretical determination of the exact control of the temporal increase or decrease of the duty cycle is, however, difficult. Depending on the requirements to be fulfilled, it is therefore preferably empirically determined in a vehicle-dependent manner.

Even though the switch-on overshoot shown in FIG. 5 assumes a constant value during the period of time selected, such a selection is not compulsory. It is also possible to use a switch-on increase which varies with time and which, starting from an initial value, decreases continuously or stepwise to the target power calculated. Likewise, a constant value or a value which varies with time and which increases from an initial value to the target power can be chosen for the switch-on decrease.

As can be seen from the above-described preferred embodiments, an exact or complete mathematical description of the heating characteristics of the auxiliary heating is often not possible so that it may perhaps be necessary to make use of experimentally determined characteristic fields. By selecting suitable characteristic fields, a mathematical description for controlling the auxiliary heating may, however, also be dispensed with completely.

According to a further preferred embodiment of the present invention, the memory of the control unit or of the temperature determination unit has stored therein a characteristic field or a plurality of characteristic fields which, in dependence upon the above-described parameters, such as the cold air temperature, the vehicle speed and the like, indicate which heating power has to be generated by the heating element so that the air discharged from the heating will have a specific hot air target temperature.

For determining the characteristic fields, measurement series are executed for a large number of input parameters, such as the cold air temperature, the magnitude of the air mass flow, the opening condition of the windows and of the convertible top, respectively, the hot air target temperature and the like, so as to experimentally determine the heating power which has to be generated by the heating element for heating the air to be heated to a target temperature. On the basis of characteristic features which are determined for each individual vehicle or type of vehicle, the control of the auxiliary heating can be adapted precisely to each individual vehicle or type of vehicle.

The determination of the characteristic fields can also be divided into individual sections. For example, the manufacturer of the auxiliary heating can experimentally determine the properties of said heating at the factory and store them in a first characteristic field, whereas the car manufacturer will subsequently determine a second characteristic field in which the influences on the part of the vehicle find expression.

Nor is it necessary to determine a characteristic field for each individual vehicle. Since only very small deviations of the properties occur within one type of vehicle or one type of auxiliary heating, it will normally suffice to determine the characteristic fields for only one vehicle of a certain type of vehicles and for only one auxiliary heating of a certain type of auxiliary heatings.

In addition, the control by means of characteristic fields allows a simple modification of the control unit and/or of the temperature determination unit, since the data stored in these modules/memory units can easily be updated via terminals 5a and 5b.

In view of the fact that motor vehicle heatings are normally accommodated in air ducts of the vehicle and supplied with fresh air by means of blowers, excessive heating may occur if the air inlet or outlet should be blocked or if the blower should fail. Since the air mass flow decreases or the air backs up in the heating element in these cases, the air contained in the air duct will be heated to a very high temperature when the heating power remains unchanged. Hence, the temperature of the discharged hot air may exceed 60° C. under certain circumstances.

In order to avoid problems through air current impediments, the control unit executes an error recognition according to a further preferred embodiment. In this embodiment, the control unit has implemented therein a plausibility check which compares the actual rotational speed of the blower with the voltage applied to the control input of the blower. In view of the fact that a reduction of the air mass conveyed by the blower, caused e.g. by a blockage of the air inlet, has the effect that a lower voltage will be required for reaching a specific speed, this voltage value is a suitable indicator for problems in the air duct.

It follows that, if the voltage, perhaps minus a tolerance limit which will have to be specified, must be excessively reduced for adjusting a specific speed, the control unit 2 will use a lower air mass flow value. The heating may e.g. be switched back by one (comfort) stage so as to compensate the reduced air mass flow. If plausibility should still not be given by reducing the air mass flow value and by the resultant heating power reduction, the air mass flow value taken into account will be reduced still further. This can be continued until the heating module has been switched off completely.

Operational faults within the air duct can, however, also be detected directly at the heating element. PTC heating elements have a temperature-dependent ohmic resistance which increases as the temperature of the heating element increases. Hence, the current flowing through the heating element will decrease when the voltage remains constant and when the temperature of the heating element rises. When air flows through the radiator elements connected to the heating element, the air will extract heat from the heating element; the heating element is, so to speak, cooled. This has the effect that the electric resistance of the heating element remains constant, although heating power is transferred to the air to be heated. It follows that, in the case of a continuous air current across the PTC element, the current flowing through the element must lie above a value that has to be specified. If the air current is disturbed, e.g. due to blockage or due to a defective blower, the current value will drop below the specified limit (PTC effect). This leads to a deactivation of the heating element.

Even though the above-described PTC effect leads to a passive deactivation of the heating element, the discharged hot air may, prior to said deactivation, perhaps be heated to temperatures which are unpleasant or bothersome for the vehicle passenger. In order to avoid this, the current across the heating element is preferably measured. If the value of the signal drops below a predetermined value, the heating element 4 will be deactivated by the control unit.

Even though the present invention has been described on the basis of preferred embodiments in the above description, the individual embodiments should not be regarded as examples which are independent of one another. On the contrary, the individual embodiments describe subaspects of the present invention whose features can, but need not, be combined with one another.

Although the auxiliary heating 1 according to the above-described embodiments is implemented such that the temperature determination unit 3 and the control unit 2 are separate components, this special embodiment is not compulsory for an auxiliary heating 1 according to the present invention. Alternatively, the respective functions can also be integrated in a single component comprising e.g. a memory and a processor, which uses the control programs stored in the memory for temperature determination and which uses control routines for controlling the heating element.

For determining the influence of the slipstream, it is also possible to supply to the control unit 2 a signal containing information on the convertible top status or the opening degree of the windows. The control unit 2 is able to recognize by means of this signal whether the convertible top or the sunroof is closed or open, or which windows are open and how far they are open.

Summarizing, the present invention discloses an electric auxiliary heating which reliably avoids temperature overshoots of the heated air. To this end, the temperature of the air flowing into the heating is determined and converted, preferably in dependence upon the desired discharge temperature, into a heating power for controlling the heating elements. This conversion preferably takes place via a stored characteristic field by means of which a plurality of vehicle parameters, such as the vehicle speed, the opening condition of the convertible top, etc., can easily be taken into account. The temperature of the incoming air can be derived from temperature values which are already available in the vehicle. A user-friendly electric heating can be realized very easily in this way; this heating can preferably be used locally in the vehicle, e.g. in the vehicle seat or in the rear of the passenger compartment. Temperature fluctuations in the heated air can be avoided reliably and easily even in the case of dynamically varying operating conditions of the motor vehicle.

The invention claimed is:

1. An electric auxiliary heating unit for a motor vehicle, comprising:
    at least one PTC heating element for heating air flowing through the auxiliary heating unit; and
    a control unit for adjusting the heating power of the at least one heating element, the control unit including a temperature determination unit for determining a cold air temperature of the air to be heated by the heating element from a weighted combination of a temperature inside the vehicle and a temperature outside the vehicle, wherein
    the control unit adjusts, in dependence upon the determined cold air temperature, the heating power to be generated by the heating element.

2. An electric auxiliary heating unit according to claim 1, further comprising an air duct including at least one air discharge opening provided in the upper area of a backrest of a vehicle seat and used for supplying air to the head, shoulder and neck area of a vehicle passenger seated on the vehicle seat.

3. An electric auxiliary heating unit according to claim 1, wherein the temperature determination unit determines the cold air temperature by taking into account an additive correction factor.

4. An electric auxiliary heating unit according to claim 1, wherein weights of the weighted combination correct a temporal variation of the cold air temperature with respect to the temperature inside the vehicle and the temperature outside the vehicle.

5. An electric auxiliary heating unit according to claim 1, further comprising a blower which supplies the air to be heated to the heating element.

6. An electric auxiliary heating unit according to claim 1, wherein the temperature inside the vehicle or the temperature outside the vehicle is provided by an air conditioning system of the motor vehicle.

7. An electric auxiliary heating unit according to claim 1, wherein the control unit is programmed with a characteristic field which describes a dependence of the heating power to be generated on input values, and wherein the heating power to be generated is adjusted in accordance with the values of said characteristic field.

8. An electric auxiliary heating unit according to claim 1, wherein the control unit deactivates the heating element if the current measured across the heating element drops below a predetermined limit.

9. An electric auxiliary heating unit according to claim 1, wherein the control unit reduces the heating power generated by the heating element if the voltage applied to an air current generating blower drops below a limit value.

10. An electric auxiliary heating unit according to claim 1, wherein, when the heating power to be generated changes, the control unit additionally increases or decreases the heating power for a predetermined period of time after the change, in accordance with said change.

11. An electric auxiliary heating unit according to claim 10, wherein the increase or decrease of the heating power to be generated is maintained constant by the control unit during said predetermined period of time or reduced to zero in a continuous or stepwise manner during said predetermined period of time.

12. An electric auxiliary heating unit according to claim 1, wherein the control unit additionally takes into account a preselectable target hot air temperature for adjusting the heating power to be generated.

13. An electric auxiliary heating unit according to claim 12, wherein the target hot air temperature is automatically adjusted in dependence upon a vehicle speed.

14. An electric auxiliary heating unit according to claim 12, wherein the target hot air temperature is automatically adjusted in dependence upon an open/closed condition of the vehicle.

15. An electric auxiliary heating unit according to claim 14, wherein the target hot air temperature is automatically adjusted in dependence upon an outside temperature.

16. An electric auxiliary heating unit according to claim 1, wherein, for adjusting the heating power to be generated, the control unit additionally takes into account a preselectable air mass flow through the auxiliary heating unit.

17. An electric auxiliary heating unit according to claim 16, wherein the air mass flow is adjusted automatically in dependence upon a vehicle speed.

18. An electric auxiliary heating unit according to claim 16, wherein the air mass flow is adjusted automatically in dependence upon an open/closed condition of the vehicle.

19. An electric auxiliary heating unit according to claim 18, wherein the air mass flow is adjusted automatically to a preselectable value in accordance with a halt signal indicative of a stationary condition of the vehicle.

20. An electric auxiliary heating unit for a motor vehicle, comprising:

at least one PTC heating element for heating air flowing through the auxiliary heating; and a control unit for adjusting the heating power of the at least one heating element, the control unit including a temperature determination unit for determining the cold air temperature of the air to be heated by the heating element, wherein the control unit adjusts, in dependence upon the determined cold air temperature, the heating power to be generated by the heating element, and wherein, for adjusting the heating power to be generated, the control unit additionally takes into account a preselectable air mass flow through the auxiliary heating unit.

* * * * *